Figure 1:
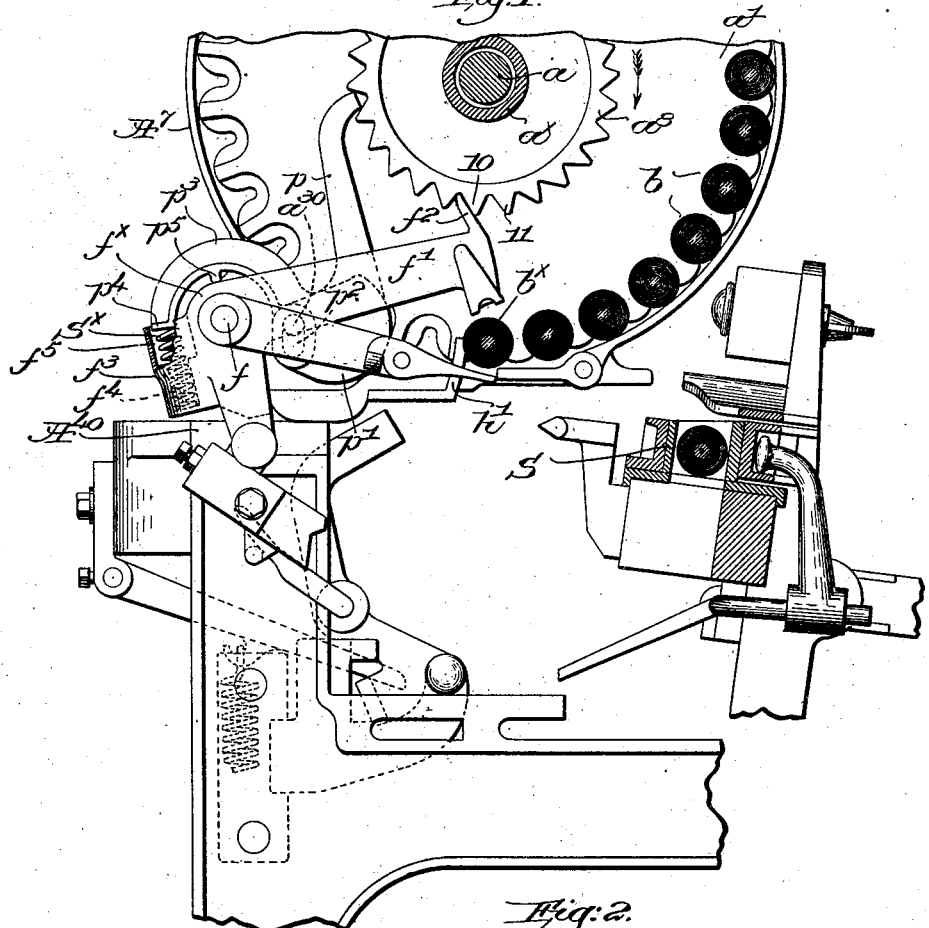

No. 710,023. Patented Sept. 30, 1902.
E. S. STIMPSON.
FILLING REPLENISHING LOOM.
(Application filed Apr. 24, 1902.)
(No Model.)

Witnesses,
Edward F. Allen.
Herman J. Sartoris

Inventor:
Edward S. Stimpson,
by Measley & Gregory
Attys.

UNITED STATES PATENT OFFICE.

EDWARD S. STIMPSON, OF HOPEDALE, MASSACHUSETTS, ASSIGNOR TO DRAPER COMPANY, OF HOPEDALE, MASSACHUSETTS, A CORPORATION OF MAINE.

FILLING-REPLENISHING LOOM.

SPECIFICATION forming part of Letters Patent No. 710,023, dated September 30, 1902.

Application filed April 24, 1902. Serial No. 104,447. (No model.)

*To all whom it may concern:*

Be it known that I, EDWARD S. STIMPSON, a citizen of the United States, and a resident of Hopedale, county of Worcester, State of Massachusetts, have invented an Improvement in Automatic Filling-Replenishing Looms, of which the following description, in connection with the accompanying drawings, is a specification, like characters on the drawings representing like parts.

In that type of filling-replenishing mechanism for looms wherein the filling-supplies are held in a movable feeder the latter is moved intermittently to bring the filling-supplies one by one into position to be transferred, and various means have been devised to effect the movement of the feeder. At first the desired movement was effected by the partial unwinding of a strong spring which was wound automatically after each transfer, the filling-supply or filling-carrier being forced by a transferrer from the feeder against the stress of the spring, and upon return movement of the transferrer to normal position the filling-carrier next to be removed was brought up with considerable jar or shock against a fixed stop, as in United States Patent No. 529,940. The strain to which the filling-carriers were subjected was injurious in its effects, and means were devised for effecting the movement of the feeder and its stoppage in such a manner that the strain upon the filling-carriers would be obviated, the use of the powerful operating-spring being eliminated. Such means are shown in United States Patent No. 651,715, wherein initial movement of the feeder is effected by a very light spring always in operative condition, the initial feeder movement being effected independently of the transferrer upon transferring movement thereof, the final and main movement of the feeder being effected by or through the transferrer on its return to normal position, the locking of the feeder also depending upon the transferrer. In a still later patent, No. 680,169, the feeder is rotated by a clutch, which is set by operative movement of the transferrer, but which does not operate until return movement of the transferrer, the spring-actuator for the clutch acting through the latter to effect the entire movement of the feeder, the stoppage thereof being effected by engagement of the filling-carrier next to be removed with a fixed stop.

My present invention while differing in construction and operation from either of the later devices referred to partakes of some of the characteristics of each and provides for a positive locking of the feeder between successive transferring operations, effects the initial movement of the feeder as soon as unlocked by means of a light and normally inactive spring, which is set or rendered active by operative movement of the transferrer, and completes the movement of the feeder positively as the transferrer resumes its normal position, stopping such movement independently of the filling-carriers. A very efficient feeder actuation is thus produced, with a soft or easy initial movement and a quick and positive completion thereof, and definite stoppage, so that at no time is a filling-carrier subjected to any strain save that due to its engagement by the transferrer.

I have herein illustrated my invention in connection with a rotatably-movable filling-feeder in which the filling-carriers are held in a circularly-arranged series.

Figure 2:
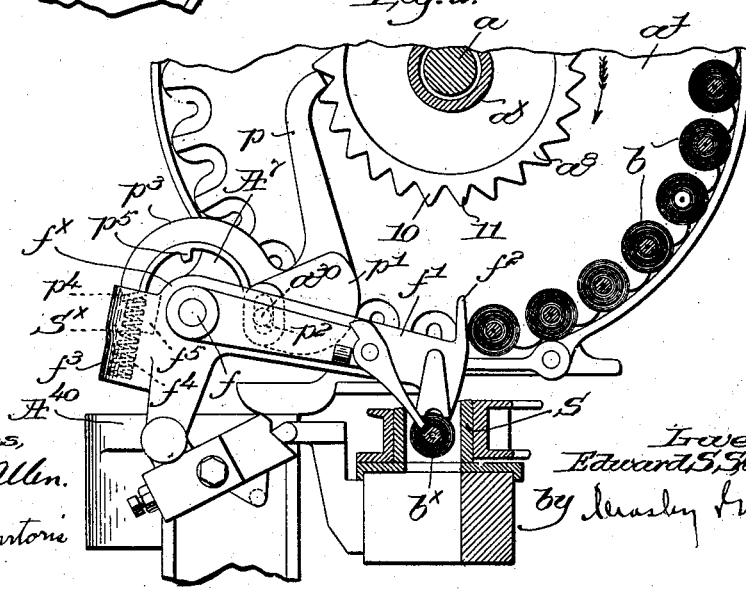

Figure 1 is a transverse section of a portion of a loom having one embodiment of my invention applied thereto, the parts of the replenishing mechanism being shown in normal position and with the section taken through the axis and between the end plates or disks forming the filling-feeder; and Fig. 2 is a view similar to Fig. 1, but showing the parts at the instant a transfer has been effected and just as the transferrer is about to return to normal position, the initial movement of the feeder having been effected.

The stand $A^7$, mounted on and near one end of the breast-beam $A^{40}$ and having a fixed horizontal stud $a$; the filling feeder or holder rotatably mounted thereon and comprising two parallel disks, one of which, as $a'$, is herein shown to support the filling-supplies or filling-carriers $b$; the hub $a^\times$, connecting the disks; the transferrer $f'$, fulcrumed on a fixed stud $f$; the means for operating the transferrer to engage and remove the filling-carriers one by one from the feeder to the shuttle S, and the fixed stop $h'$ for the endmost filling-carrier $b^\times$ of the series in the feeder may be and are all substantially as shown and described in United States Patent No. 680,169, referred to, the filling-carriers being held in a circularly-arranged series in the feeder. The toothed wheel or disk $a^8$, rotatable with the feeder and shown as mounted on the inner face of the feeder-disk $a'$, is also substantially as in said patent; but, as will appear hereinafter, this wheel $a^8$ is operative not only for effecting movement of the feeder, but also for maintaining it locked independently of the filling-carriers.

The transferrer $f'$ is herein shown as provided with an upturned projection or dog $f^2$, which enters a notch of the disk or wheel $a^8$ when the transferrer is in normal position, Fig. 1, and locks the holder from movement, the rear edge of the dog at such time bearing against the face of the adjacent tooth, as 10, the notches of the disk being positioned to correspond with the location of the filling-carriers, so that the endmost one, $b^\times$, thereof will just bear against the stop $h'$ when the feeder is locked. At its outer end the hub of the transferrer is enlarged beyond the stud $f$, as at $f^3$, and provided with a socket $f^4$, enlarged or counterbored at its upper end at $f^5$, and a rather light coiled spring $S^\times$ is seated in the socket, its upper end extending into the counterbored portion.

A starting device or pawl $p$, upturned and bent at its upper end to engage the toothed disk $a^8$, is enlarged at its lower end, as at $p'$, and provided with an elongated upright slot $p^2$ to receive a fulcrum-stud $a^{30}$, extended laterally from the stand $A^7$, the heavy end of the pawl normally maintaining it in the position shown in Fig. 1. The pawl is provided with an upwardly-curved and forwardly-extended tail $p^3$, which projects over the hub of the transferrer, and at its free end the tail has a lateral enlargement or flange $p^4$, normally just above the end of the spring $S^\times$, the end of the tail entering the counterbore $f^5$. A depending lug $p^5$ is shown on the tail to normally rest on the transferrer-hub $f^\times$ and acting with the weighted end $p'$ of the pawl to normally retain it in the position shown in Fig. 1, and at such time the spring $S^\times$ is entirely uncompressed and quiescent or inactive.

When the transferrer is swung downward to engage and transfer the endmost filling-carrier, as $b^\times$, from the holder to the shuttle, such operative movement withdraws the dog $f^2$ from the disk $a^8$, so that as the filling-carrier is conveyed to the shuttle the feeder is free to be moved the instant such filling-carrier passes below the stop $h'$. While such operative movement of the transferrer is taking place, however, the rise of the enlargement $f^3$ on the hub $f^\times$ causes the spring $S^\times$ to be compressed between the tail $p^3$ of the pawl $p$ and the bottom of the socket $f^4$, such compression being sufficient to lift the pawl and its tail bodily, as shown in Fig. 2, and thereby effect a rotative movement of the feeder just as soon as permitted by the passage therefrom of the filling-carrier being transferred. Such bodily movement of the pawl and the slight accompanying rocking thereof are permitted by the elongation of the slot $p^2$. The movement thus imparted to the feeder is effected during the operative or transferring movement of the transferrer manifestly, and the next filling-carrier of the series is thereby brought into the position shown in Fig. 2 against the dog $f^2$. While this movement of the feeder may be very slight, yet it is sufficient to move the tooth 10 of the disk $a^8$ far enough to bring its rear face into the path of the end of the dog $f^2$ when the transferrer returns to its normal position, and as it does so the dog will act upon the tooth 10 and continue and complete the feeder movement until the front face of the next tooth 11 brings up against the rear edge of the dog, and the feeder will then be locked, with the endmost filling-carrier in position to be engaged upon the next operation of the transferrer. The feeder cannot move forward during return movement of the transferrer until the head of the latter clears the filling-carrier adjacent thereto, and locking of the feeder is effected just as such filling-carrier reaches the stop $h'$. As the transferrer is returning to normal position the tension of the spring $S^\times$ gradually decreases and reaches its minimum upon completion of the return movement, the starting-pawl returning to its normal position as permitted by the spring. This spring is entirely inactive or quiescent under normal conditions manifestly and can only become active by or through operative movement of the transferrer, and at such time it imparts a soft or yielding movement to the feeder through the pawl $p$. The stop $h'$ acts as a guide for the filling-carrier being transferred, and it also serves as a stop to prevent movement of the feeder when unlocked until the filling-carrier is moved below the lower end of the stop, the spring $S^\times$ being compressed during the instant the stop holds the feeder from feeding movement. The operative engagement of the pawl and dog with the toothed disk $a^8$ is effected in alternation, the pawl being rendered active by and during operative movement of the transferrer, while the dog is rendered inoperative or inactive, and when said dog is rendered active upon return movement of the transferrer the pawl is rendered inactive.

By the present invention the movement of the feeder is effected in an effective manner without shock or jar to the filling-carriers and by the use of a single and comparatively light spring which is absolutely inactive under normal conditions.

I have herein shown one practical embodiment of my invention and have not attempted to show or describe the various changes or modifications which may be made therein by those skilled in the art without departing from the spirit and scope of my invention.

Having described my invention, what I claim as new, and desire to secure by Letters Patent, is—

1. A movable filling-feeder to hold a series of filling-carriers, a starter therefor, a transferrer, means controlled by transferring movement thereof to render said starter operative to effect initial movement of the feeder, and a device to positively complete the feeder movement as the transferrer resumes its normal position.

2. A movable filling-feeder to hold a series of filling-carriers, a starter therefor, a transferrer, means controlled by transferring movement thereof to render said starter operative to effect initial movement of the feeder, and a device to positively complete the feeder movement as the transferrer resumes its normal position and to positively lock the feeder between successive operations of the transferrer.

3. A movable filling-feeder to hold a series of filling-carriers, a starter therefor, a transferrer, means controlled by transferring movement thereof to render said starter operative to effect initial movement of the feeder, and a device movable with the transferrer to complete such feeder movement as the transferrer resumes its normal position.

4. A movable filling-feeder to hold a series of filling-carriers, means independent of the filling-carriers to normally lock the feeder from movement, a transferrer, operative movement thereof releasing the feeder from the locking means, and means controlled by such operative movement of the transferrer to immediately effect initial movement of the feeder when released.

5. A movable filling-feeder to hold a series of filling-carriers, means independent of the filling-carriers to normally lock the feeder from movement, a transferrer, operative movement thereof releasing the feeder from the locking means, and means, including a spring set by operative movement of the transferrer, to yieldingly start the feeder when unlocked.

6. A rotatable filling-feeder to hold a circularly-arranged series of filling-carriers, a transferrer, means movable therewith to normally lock the feeder from movement, and a starting device for the feeder, including a spring set by operative movement of the transferrer, to render the starting device operative to effect movement of the feeder when released from the control of the locking means.

7. A rotatable filling-feeder to hold a circularly-arranged series of filling-carriers, an attached toothed disk, a transferrer, means controlled by operative movement thereof to coöperate with said disk and start the rotative movement of the feeder, and an independent device movable with the transferrer to also coöperate with the disk and lock the feeder when the transferrer is in normal position.

8. A rotatable filling-feeder, means independent of the filling-carriers held thereby and movable with the transferrer to normally lock the feeder from movement, a transferrer to remove the filling-carriers one by one, and means controlled by operative movement of the transferrer to yieldingly start the movement of the feeder, such transferrer movement unlocking the feeder, return of the transferrer to normal position acting through the locking means to complete the feeder movement and positively lock it with the filling-carrier next to be removed in the path of the transferrer.

9. A rotatable filling-feeder to hold a plurality of circularly-arranged filling-carriers, an attached toothed disk, a coöperating pawl having a rocking and a bodily movement, a transferrer, a spring adapted when set to rock and move the pawl bodily to initiate rotation of the feeder, and means to normally lock the feeder, operative movement of the transferrer releasing the feeder from the locking means and also setting the spring.

10. A rotatable filling-feeder adapted to hold a series of filling-carriers, a disk notched to correspond to the position of the filling-carriers, a transferrer, a dog thereon to normally enter a notch of the disk and lock the feeder, and means, including an actuating-spring, rendered effective by operative movement of the transferrer, to impart initial movement to the feeder when the dog is withdrawn from the disk, return of the transferrer to normal position acting through the dog and disk to complete the movement of the feeder and to relax the actuating-spring.

11. A movable filling-feeder to hold a series of filling-carriers, a transferrer to engage and remove the latter one by one, means controlled by the transferrer to normally prevent movement of the feeder, a starter to initiate movement of the feeder, a normally inactive operating-spring for said starter and means governed by operative movement of the transferrer to render the spring active to effect the operation of the starter and start the feeder when free to move during such movement of the transferrer.

12. A movable filling-feeder to hold a series of filling-carriers, a transferrer to engage and remove the latter one by one, means controlled by the transferrer to normally prevent movement of the feeder, and means to overcome the inertia of the feeder when free to move, said means including a normally inactive spring and a starting-pawl, transferring movement of the transferrer releasing the feeder and also rendering the spring active to move the pawl and start the feeder during such movement of the transferrer.

13. A step-by-step rotatable holder adapted to contain a plurality of filling-supplies, a transferrer to remove the latter one by one, means to unlock the holder by transferring movement of said transferrer, and means actuated by the latter during such movement to effect rotation of the holder.

14. A rotatable holder to support a series of filling-supplies, an attached toothed disk, a transferrer, starting means actuated by and operating during transferring movement of the transferrer to effect initial rotative movement of the holder, and means actuated by and operating upon return movement of the transferrer to complete the movement of the holder, both of said means coöperating with the toothed disk.

15. A rotatable filling-supply holder, a transferrer to remove the filling-supplies singly therefrom, and means controlled by the transferrer to effect step-by-step movement of the holder and to lock it between successive operations of the transferrer, said means including a normally inoperative spring-acting member and a positively-acting member, coöperating alternately with the holder during the operating and return movement of the transferrer, both members coacting with the holder when at rest.

16. A movable filling-supply holder, a transferrer, and means to move the holder, said means including a normally quiescent pawl, and a spring interposed between the pawl and the transferrer, operative movement of the latter compressing the spring and acting through it upon the pawl to effect movement of the holder.

17. A movable filling-supply holder, a transferrer having a socketed extension, a spring seated therein, and means to move the holder, said means including a normally quiescent pawl having a tail extended in the path of the spring, operative movement of the transferrer moving the spring into engagement with and compressing it against the tail, the force of the spring when compressed moving the pawl to coöperate with and effect movement of the holder.

18. A rotatable filling-supply holder having an attached toothed disk, a pawl coöperating with the disk and having a tail, a transferrer provided with an extension, and a spring interposed between said extension and the tail of the pawl, operative movement of the transferrer compressing the spring and acting therethrough to yieldingly move the pawl to effect movement of the holder.

19. A rotatable filling-supply holder having an attached toothed disk, a pawl coöperating with the disk and having a tail, a transferrer provided with an extension, a spring interposed between said extension and the tail of the pawl, and a locking-dog on the transferrer, operative movement of the latter compressing the spring and therethrough causing the pawl to move the holder, return movement of the transferrer effecting engagement of the dog with the disk to lock the holder from movement.

In testimony whereof I have signed my name to this specification in the presence of two subscribing witnesses.

EDWARD S. STIMPSON.

Witnesses:
FRANK J. DUTCHER,
ERNEST W. WOOD.